United States Patent
Zhang et al.

(10) Patent No.: US 12,355,699 B2
(45) Date of Patent: Jul. 8, 2025

(54) METHOD OF CODEBOOK SOUNDING REFERENCE SIGNAL (SRS) ANTENNA MAPPING TO IMPROVE UPLINK PERFORMANCE

(71) Applicant: Apple Inc., Cupertino, CA (US)

(72) Inventors: Lijie Zhang, Beijing (CN); Lele Cui, Beijing (CN); Aiman J. Sang, Cupertino, CA (US); Yu Wu, Beijing (CN); Yun Gao, Beijing (CN); Ying Zhang, Beijing (CN); Zhiwei Wang, Beijing (CN); Qiang Miao, Beijing (CN)

(73) Assignee: APPLE INC., Cupertino, CA (US)

( * ) Notice: Subject to any disclaimer, the term of this patent is extended or adjusted under 35 U.S.C. 154(b) by 274 days.

(21) Appl. No.: 17/807,021

(22) Filed: Jun. 15, 2022

(65) Prior Publication Data
US 2023/0036406 A1 Feb. 2, 2023

(30) Foreign Application Priority Data
Jul. 1, 2021 (WO) ................ PCT/CN2021/104111

(51) Int. Cl.
*H04B 7/04* (2017.01)
*H04B 17/318* (2015.01)
(Continued)

(52) U.S. Cl.
CPC ......... *H04L 5/0051* (2013.01); *H04B 17/318* (2015.01); *H04B 17/336* (2015.01);
(Continued)

(58) Field of Classification Search
CPC .. H04L 5/0051; H04L 25/0226; H04B 7/0404
See application file for complete search history.

(56) References Cited

U.S. PATENT DOCUMENTS

2019/0349061 A1* 11/2019 Cirik .................. H04W 72/046
2020/0107341 A1* 4/2020 Zhang ................. H04W 72/23
(Continued)

FOREIGN PATENT DOCUMENTS

CN 110168947 A 8/2019
CN 110463264 A 11/2019
(Continued)

OTHER PUBLICATIONS

International Search Report and Written Opinion of the International Searching Authority directed to related International Patent Application No. PCT/CN2021/104111, mailed Feb. 25, 2022; 9 pages.
(Continued)

*Primary Examiner* — Shukri Taha
(74) *Attorney, Agent, or Firm* — Sterne, Kessler, Goldstein & Fox P.L.L.C.

(57) ABSTRACT

Aspects are described for a user equipment (UE) comprising a transceiver configured to enable wireless communication with a base station; and a processor communicatively coupled to the transceiver. The processor is configured to receive a sounding reference signal (SRS) resource configuration from the base station, wherein the SRS resource configuration indicates at least a first SRS resource and a second SRS resource. The processor is further configured to transmit a first SRS via the first SRS resource to the base station using a first antenna coupled to the transceiver and transmit a second SRS via the second SRS resource to the base station using a second antenna coupled to the transceiver. The processor is further configured to receive an SRS resource indicator (SRI) from the base station based on at least one of the transmission of the first SRS or the second SRS; select the first antenna based on the SRI indicating the
(Continued)

first SRS resource; and transmit uplink data to the base station using the first antenna.

18 Claims, 7 Drawing Sheets

(51) Int. Cl.
    *H04B 17/336*    (2015.01)
    *H04L 5/00*    (2006.01)
    *H04W 72/02*    (2009.01)
    *H04W 72/23*    (2023.01)
    *H04W 72/542*    (2023.01)

(52) U.S. Cl.
    CPC ........... *H04W 72/02* (2013.01); *H04W 72/23* (2023.01); *H04W 72/542* (2023.01)

(56) References Cited

U.S. PATENT DOCUMENTS

2020/0220592 A1* 7/2020 Ryu ................... H04L 5/0048
2021/0160845 A1 5/2021 Bhattad et al.
2022/0052742 A1 2/2022 Huang et al.
2023/0073090 A1* 3/2023 Harrison ............... H04L 5/0092

FOREIGN PATENT DOCUMENTS

| CN | 110838860 A | 2/2020 | |
|---|---|---|---|
| CN | 111656849 A | 9/2020 | |
| CN | 112585901 A | 3/2021 | |
| WO | WO 2018169357 A1 | 9/2018 | |
| WO | WO-2020020120 A1 * | 1/2020 | ............... H04B 7/02 |

OTHER PUBLICATIONS

Huawei, HiSilicon: "Antenna selection transmission for PUSCH," 3GPP Draft; R1-1800909, 3GPP TSG RAN WG1 Ad-Hoc Meeting #4, Vancouver, Canada, Jan. 2018; 3 pages.

Ericsson: "Single Antenna and Antenna Selection UL Transmission," 3GPP Draft; R1-1718429, 3GPP TSG-RAN WG1 #90bis, Prague, Czech Republic, Oct. 2017; 4 pages.

First Office Action directed to related Chinese Application No. 202180007173.4, mailed May 13, 2025, with machine translation attached; 18 pages.

* cited by examiner

METHOD OF CODEBOOK SOUNDING REFERENCE SIGNAL (SRS) ANTENNA MAPPING TO IMPROVE UPLINK PERFORMANCE

CROSS-REFERENCE TO RELATED APPLICATIONS

This application claims priority to International Application No. PCT/CN2021/104111, entitled "METHOD OF CODEBOOK SOUNDING REFERENCE SIGNAL (SRS) ANTENNA MAPPING TO IMPROVE UPLINK PERFORMANCE", filed Jul. 1, 2021, the contents of which are hereby incorporated by reference herein in its entirety.

BACKGROUND

Field

The described aspects generally relate to an enhancement on an uplink transmission of wireless communication.

SUMMARY

Some aspects of this disclosure relate to apparatuses and methods for implementing an antenna mapping for uplink performance improvement for 3rd Generation Partnership Project (3GPP) release 15 (Rel-15), release 16 (Rel-16), release 17 (Rel-17), and/or other 3GPP releases. For example, systems and methods are provided for implementing an antenna selection based on codebook sounding reference signal (SRS).

Some aspects of this disclosure relate to a user equipment (UE) comprising a transceiver configured to enable wireless communication with a base station and a processor communicatively coupled to the transceiver. The processor is configured to receive a sounding reference signal (SRS) resource configuration from the base station, wherein the SRS resource configuration indicates at least a first SRS resource and a second SRS resource. The processor is further configured to transmit a first SRS via the first SRS resource to the base station using a first antenna coupled to the transceiver and transmit a second SRS via the second SRS resource to the base station using a second antenna coupled to the transceiver. The processor is further configured to receive an SRS resource indicator (SRI) from the base station based on at least one of the transmission of the first SRS or the second SRS. The processor is further configured to select the first antenna based on the SRI indicating the first SRS resource, and transmit uplink data to the base station using the first antenna.

Some aspects of this disclosure relate to a method of operating a UE to communicate with a base station. The method comprises receiving an SRS resource configuration from the base station, wherein the SRS resource configuration indicates at least a first SRS resource and a second SRS resource. The method further comprises transmitting a first SRS via the first SRS resource to the base station using a first antenna of the UE and transmitting a second SRS via the second SRS resource to the base station using a second antenna of the UE. The method further comprises receiving an SRI from the base station, selecting the first antenna based on the SRI indicating the first SRS resource, and transmitting uplink data to the base station using the first antenna of the UE.

Some aspects of this disclosure relate to a base station comprising a transceiver configured to enable communication with a UE and a processor communicatively coupled to the transceiver. The processor is configured to generate an SRS resource configuration indicating at least a first SRS resource and a second SRS resource and transmit the SRS resource configuration to the UE using the transceiver. The processor is further configured to receive a first SRS via the first SRS resource and a second SRS via the second SRS resource from the UE, compare the first SRS with the second SRS, select the first SRS based on the comparison, and select the first SRS resource based on the selection of the first SRS. The processor is further configured to generate an SRI based on the selection of the first SRS resource and transmit the SRI to the UE.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
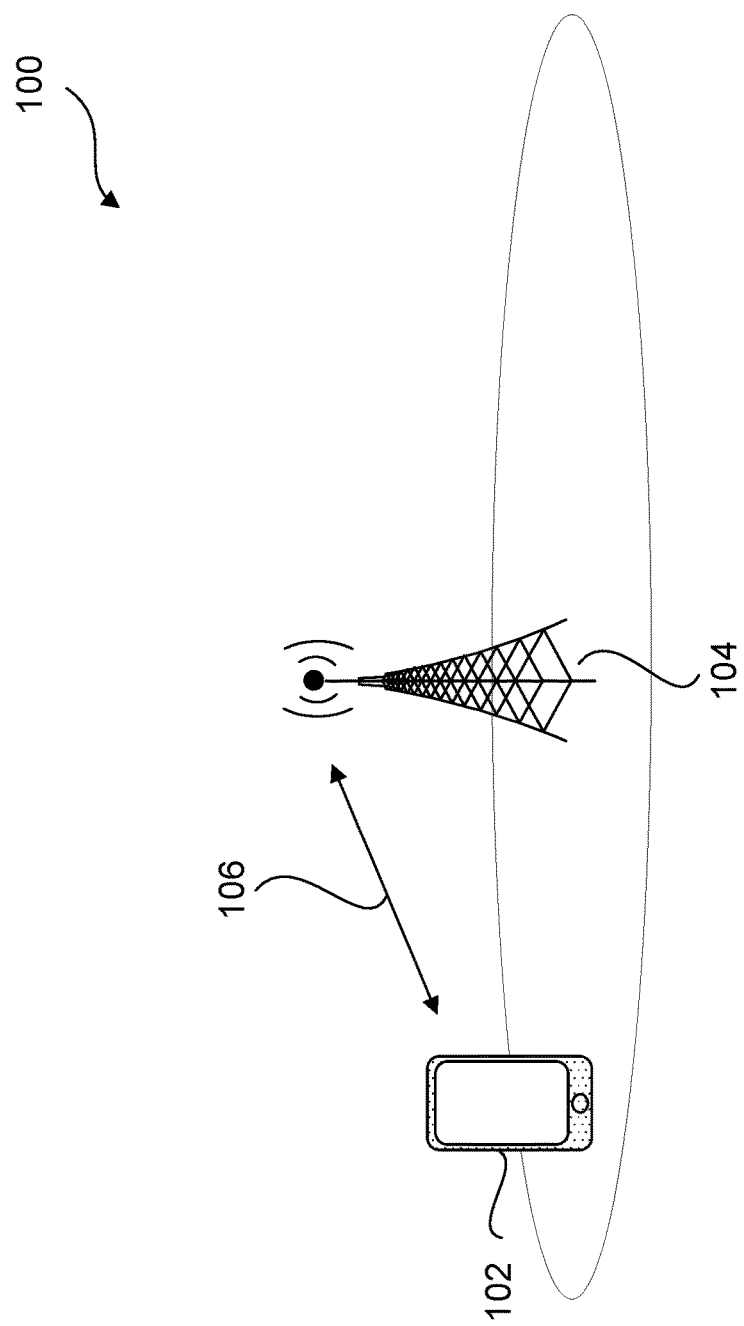
FIG. 1 illustrates an example system implementing an antenna mapping for uplink performance improvement, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing an antenna mapping for uplink performance improvement for 3rd Generation Partnership Project (3GPP) release 15 (Rel-15), release 16 (Rel-16), release 17 (Rel-17), and/or other 3GPP releases. For example, systems and methods are provided for implementing designs for an antenna selection based on codebook sounding reference signal (SRS).

According to some aspects, a user equipment (UE) that operates according to Release 15 (Rel-15), Release 16 (Rel-16), and/or Release 17 (Rel-17) and/or New Radio (NR) of $5^{th}$ generation (5G) wireless technology for digital cellular networks as defined by 3GPP, and the UE can support a plurality of antennas. For example, the UE comprises four antennas. The UE can communicate with a base station using any of the four antennas or combinations of the four antennas. In some aspects, signals transmitted from different antennas of the UE experience different levels of distortion when received by the base station. For example, the base station receives a first signal from the first antenna of the UE and a second signal from the second antenna of the UE. The first signal may have a higher signal strength than the second signal. The first signal may also have a different phase distortion compared with the second signal. In some aspects, the first and the second signals are SRSs that are known to the base station. Therefore, the base station can estimate channel conditions from the first and the second antennas using the SRSs received from the UE.

According to some aspects, the UE comprises multiple antenna ports corresponding to different antennas. For example, the UE may comprise a first antenna port corresponding to the first antenna and a second antenna port corresponding to the second antenna. The UE may also comprise a third antenna port corresponding to the first and the second antennas.

In some aspects, the base station selects an antenna of the UE based on the SRSs received from the UE. For example, the base station selects the antenna corresponding to a received SRS having the highest signal strength. The base station can also select an antenna port of the UE based on the SRSs received. In some aspects, the base station's capability of evaluating the SRSs received from the UE is limited. For example, the base station may be able to evaluate two SRSs at the same time. In other words, the base station can select one antenna out of two antennas.

According to some aspects, the UE may comprise four antennas as discussed above. The UE can work with the base station to perform a two-step antenna selection process to select a best antenna out of the four antennas of the UE. For example, in step one, the UE selects two antennas out of four antennas and transmits SRSs to the base station using the two selected antennas. In step two, the base station selects one antenna out of two antennas based on the SRSs received. In some aspects, the base station notifies the UE the selected antenna via a downlink transmission. For example, the base station transmits an SRS resource indicator (SRI) to the UE, wherein the SRI indicates an SRS resource corresponding to the selected antenna. The UE performs an SRI-based antenna selection using the received SRI. In other aspects, the base station transmits a pre-coding matrix indicator (PMI) to the UE, wherein the PMI corresponds to a code-book that can be used by the UE for antenna selection. The UE then performs a code-book based antenna selection.

FIG. 1 illustrates an example system 100 implementing designs of an antenna mapping for uplink performance improvement, according to some aspects of the disclosure. Example system 100 is provided for the purpose of illustration only and does not limit the disclosed aspects. System 100 may include, but is not limited to, a UE 102 and a base station 104. The UE 102 may be implemented as an electronic device configured to operate based on a wide variety of wireless communication techniques. These techniques may include, but are not limited to, techniques based on 3rd Generation Partnership Project (3GPP) standards. For example, the UE 102 may include electronic devices configured to operate using one or more 3GPP releases, such as Release 15 (Rel-15), Release 16 (Rel-16), Release 17 (Rel-17), or other 3GPP releases. The UE 102 may include, but is not limited to, wireless communication devices, smartphones, laptops, desktops, tablets, personal assistants, monitors, televisions, wearable devices, Internet of Things (IoT) devices, vehicle communication devices, and the like. The base station 104 may include one or more nodes configured to operate based on a wide variety of wireless communication techniques such as, but not limited to, techniques based on the 3GPP standards. For example, the base station 104 may include nodes configured to operate using Rel-15, Rel-16, Rel-17, or other 3GPP releases. The base station 104 may include, but not limited to NodeBs, eNodeBs, gNBs, new radio base stations (NR BSs), access points (APs), remote radio heads, relay stations, and others.

In some aspects, the UE 102 connects with the base station 104 via a communication link 106, which includes uplink (UL) and downlink (DL) connections. As discussed above, the UE 102 comprises a plurality of antennas. For example, the UE 102 may comprise four antennas. The UE 102 can transmit to the base station 104 in an UL connection using any of the four antennas. In some aspects, qualities of channels between each antenna and the base station 104 may be different. For example, signals transmitted from a first antenna of the UE 102 may experience a least degradation when received by the base station 104. In such a case, the UE 102 transmits signals to the base station 104 in the UL connection via the first antenna.

In some aspects, the UE 102 can transmit using more than one antenna. For example, the UE 102 selects the first and the second antennas out of the plurality of antennas based on signal strengths, signal-to-noise ratios (SNRs), and/or a correlation level between the first and the second antennas. The UE 102 then transmits using both the first antenna and a second antenna of the UE 102 simultaneously. In some aspects, the UE 102 performs precoding to adjust weights and phase rotations of signals that are transmitted by the first and the second antennas. In some aspects, the base station 104 determines and transmits a precoding matrix indicator (PMI) to the UE 102 via a DL connection of the communication link 106. The UE 102 determines a code-book based on the PMI and performs the precoding based on the code-book. After that, the UE 102 transmits the signals to the base station 104 via the first and the second antennas. In some aspects, signals transmitted via the first and the second antennas contain same underlay information and are combined accumulatively when received at the base station 104 because of the precoding. For example, the signals are generated based on the same underlay information, but multiplied by different parameters of the code-book.

Figure 2:
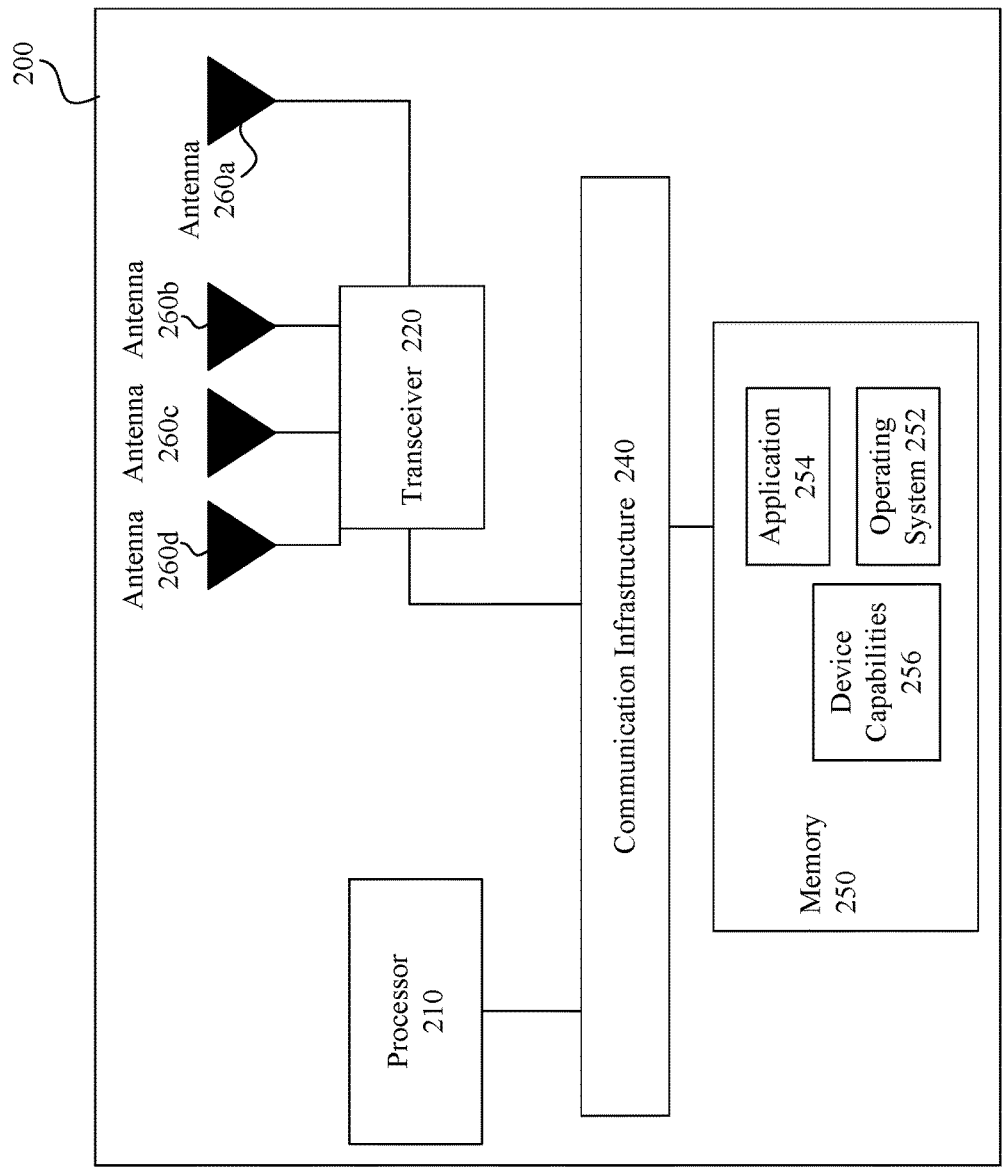
FIG. 2 illustrates a block diagram of an example system of an electronic device for the antenna mapping, according to some aspects of the disclosure.

FIG. 2 illustrates a block diagram of an example system 200 of an electronic device implementing the antenna mapping for uplink performance improvement, according to some aspects of the disclosure. The system 200 may be any of the electronic devices (e.g., the UE 102 and the base station 104) of the system 100. The system 200 includes a processor 210, one or more transceivers 220, a communication infrastructure 240, a memory 250, an operating system 252, an application 254, and antennas 260a, 260b, 260c and 206d. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling system 200 of the system 100 to implement mechanisms for the antenna mapping for uplink performance improvement, as described herein. Alternatively, or additionally, the processor 210 can be "hard coded" to implement antenna mapping for uplink performance improvement, as described herein.

The one or more transceivers 220 transmit and receive communications signals support antenna mapping for uplink performance improvement. Additionally, the one or more transceivers 220 transmit and receive communications signals that support mechanisms for measuring communication link(s), generating and transmitting system information, and receiving the system information. According to some aspects, the one or more transceivers 220 may be coupled to the antennas 260a, 260b, 260c and 206d to wirelessly transmit and receive the communication signals. The antennas 260a, 260b, 260c and 206d may be the same or different types. In some aspects, the antennas 260a, 260b, 260c and 206d are located in different positions of the system 200, such as four corners of the system 200. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-7, processor 210 may implement different mechanisms for the antenna mapping for uplink performance improvement as discussed with respect to the system 100 of FIG. 1.

Figure 3:
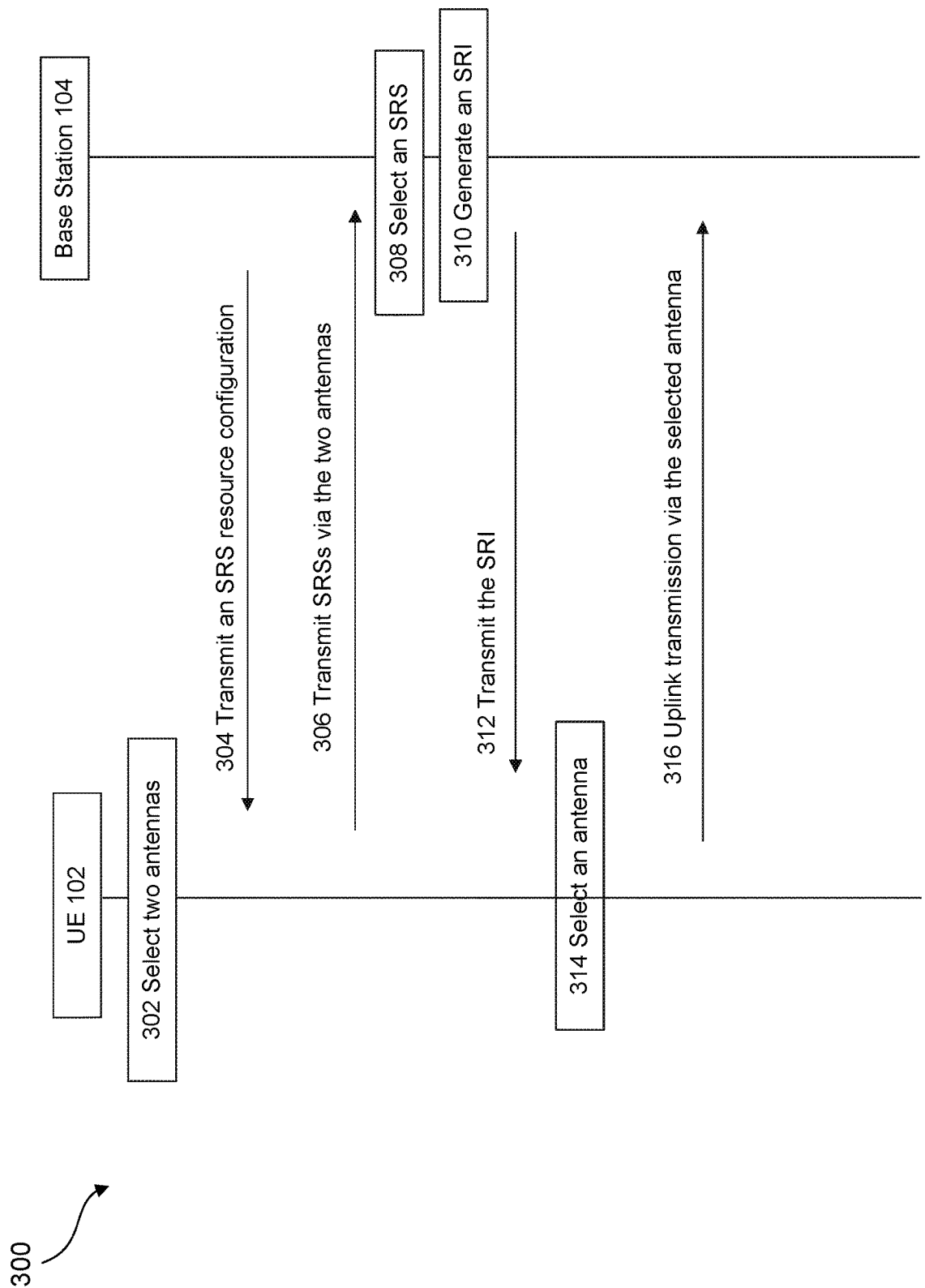
FIG. 3 illustrates an example method for a two-step antenna selection using a sounding reference signal (SRS) resource indicator (SRI), according to aspects of the disclosure.

FIG. 3 illustrates an example method 300 for a two-step antenna selection using an SRI. As a convenience and not a limitation, FIG. 3 may be described with regard to elements of FIGS. 1, 2, and 7. Method 300 may represent the operation of electronic devices (for example, the UE 102 and the base station 104 of FIG. 1) implementing the antenna mapping for uplink performance improvement. The example method 300 may also be performed by system 200 of FIG. 2, controlled or implemented by processor 210, and/or computer system 700 of FIG. 7. But method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, the UE 102 selects two antennas from a plurality of antennas of the UE 102, which is a first step of the two-step antenna selection. For example, the UE 102 selects the antennas 260a and 260b from antennas 260a-260d of the system 200. In some aspects, the UE 102 selects the antennas 260a and 260b based on signal metrics, such as reference signal receive power (RSRP) levels and/or signal-to-noise ratios (SNRs). For example, the UE 102 receives signals, such as channel state information reference signals (CSI-RSs) or synchronization signal block (SSB) signals, from the base station 104 using antennas 260a, 260b, 260c and 206d via a DL connection of the communication link 106. The UE 102 calculates the RSRP levels and/or SNRs of the CSI-RSs or the SSB signals received using each antenna and determines that the CSI-RSs or the SSB signals received using the antennas 260a and 260b have highest RSRP levels or SNRs. In some aspects, the UE 102 selects the antennas 260a and 260b by determining that the RSRP levels corresponding to the antennas 260a and 260b are higher than a power threshold, or that the SNRs corresponding to the antennas 260a and 260b are higher than an SNR threshold.

In some aspects, the UE 102 selects the antennas 260a and 260b based on signal metrics and correlation levels. For example, the UE 102 determines that the CSI-RS or the SSB signals received using the antenna 206a has the highest RSRP level or SNR. The UE 102 selects the antenna 260a. Subsequently, the UE 102 determines correlation values between the antennas 260a and each of the antennas 260b, 260c, and 206d. The UE 102 may determine that the correlation value between the antennas 260a and 260b is the lowest and/or below a correlation threshold and select the antenna 260b. In some aspects, the correlation values depend on locations and/or directions of the antennas 260a, 260b, 260c and 206d.

In some aspects, the UE 102 selects the antennas 260a and 260b based on correlation values without consideration of signal metrics. For example, the UE 102 determines correlation values of each pair of two antennas among the antennas 260a, 260b, 260c, and 206d. In such a case, there are six pairs of antennas. The UE 102 may determine that the correlation value of the pair of the antennas 260a and 260b is the highest and select the antennas 260a and 260b.

At 304, the base station 104 transmits an SRS resource configuration to the UE 102. In some aspects. The SRS resource configuration indicates at least two SRS resources, i.e., a first and a second SRS resource. For example, the SRS resource configuration indicates time and frequency resources for the UE 102 to transmit SRSs to the base station 104. In some aspects, the base station 104 transmits the SRS resource configuration periodically with an SRS period.

In some aspects, the SRS resource configuration also includes an antenna mapping indicator that specifies either SRI based antenna selection or PMI based antenna selection. In this example, the antenna mapping indicator instructs the UE 102 to perform the SRI based antenna selection. In some aspects, the base station 104 transmits the antenna mapping indicator via downlink control information (DCI), wherein the one or more bits corresponding to the antenna mapping indicator are different from those of the SRS resource configuration. For example, the base station 104 includes the antenna mapping indicator in a txConfig parameter of the DCI.

At 306, the UE 102 transmits a first SRS via the first SRS resource via the antenna 260a and transmits a second SRS via the second SRS resource via the antenna 260b to the base station 104.

At 308, upon receiving the first and the second SRSs, the base station 104 calculates RSRP levels and/or SNRs of the first and the second SRSs received. The base station 104 may determine that the first SRS has a higher RSRP level or SNR and select the first SRS. In some aspects, the base station 104 calculates bit error rates (BERs) of the first and the second SRSs received. The base station 104 may determine that the first SRS has a lower BER and select the first SRS.

At 310, the base station 104 generates an SRI based on the first SRS. For example, the base station 104 identifies the first SRS resource corresponding to the first SRS. The base station 104 then determines an indicator corresponding to the first SRS resource and includes the indicator in the SRI.

At 312, the base station 104 transmits the SRI to the UE 102. In some aspects, the base station 104 transmits the SRI using DCI via a DL connection of the communication link 106.

At 314, the UE 102 selects an antenna from the antennas 260a and 260b based on the SRI received from the base station 104. Step 314 alone or in combination with steps 304, 306, 308, 310, and 312 is a second step of the two-step antenna selection. In some aspects, the UE 102 determines that the SRI indicates the first SRS resource. Since the UE 102 transmits the first SRS using the first SRS resource via the antenna 260a, the UE 102 determines that the first SRS resource corresponds to the antenna 260a. Accordingly, the UE 102 determines that the SRI indicates the antenna 260a and selects the antenna 260a for subsequent uplink transmissions. In other words, the UE 102 selects one of the two antennas 260a,b based on the SRI.

At 316, the UE 102 performs uplink transmissions using the antenna 260a. In some aspects, the uplink transmissions include at least physical uplink control channel (PUCCH) transmissions and/or physical random access channel (PRACH) transmissions.

Figure 4:
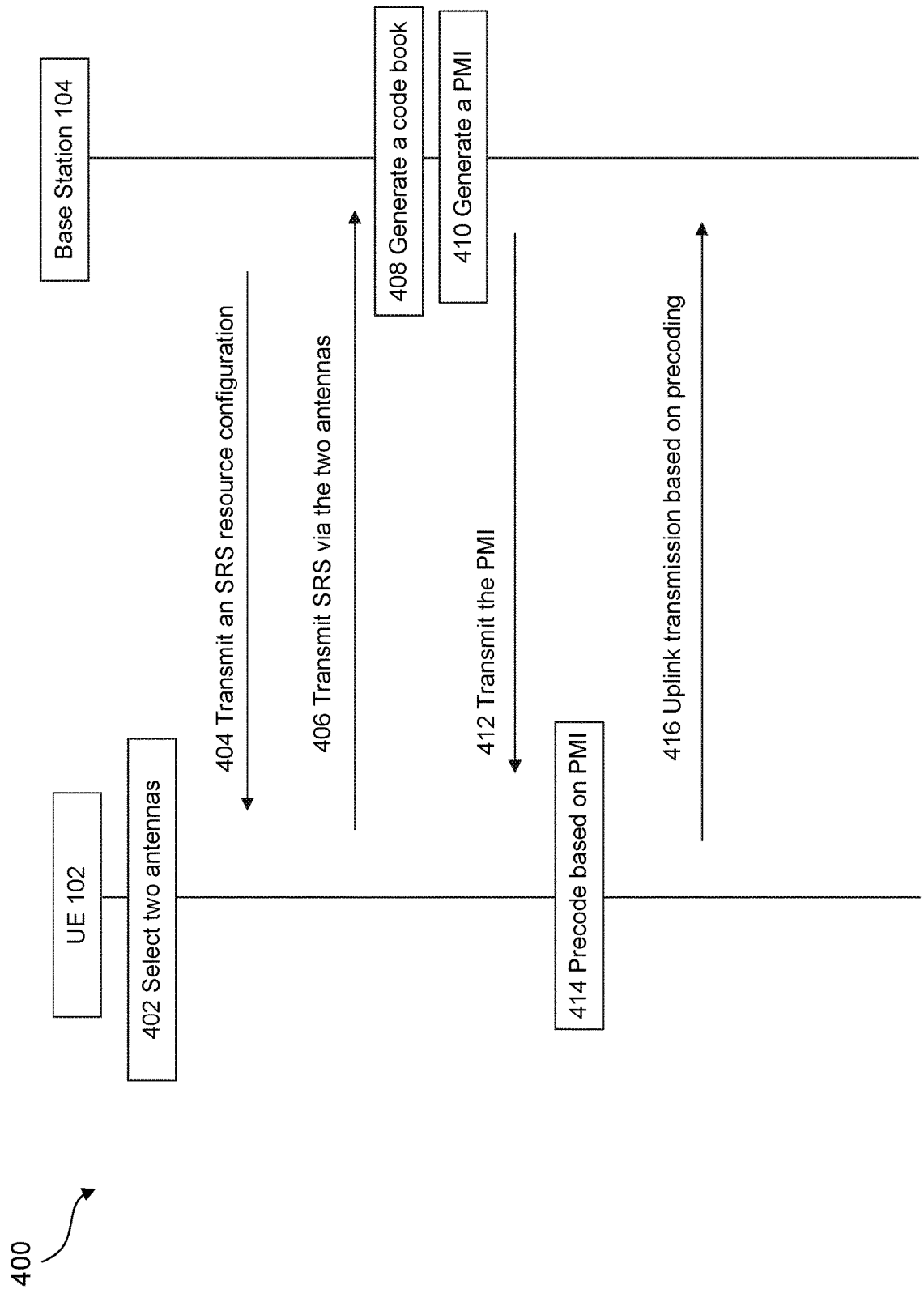
FIG. 4 illustrates an example method for a two-step antenna selection using a pre-coding matrix indicator (PMI), according to aspects of the disclosure.

FIG. 4 illustrates an example method for a two-step antenna selection using a PMI. As a convenience and not a limitation, FIG. 4 may be described with regard to elements of FIGS. 1, 2, and 7. Method 400 may represent the operation of electronic devices (for example, the UE 102 and the base station 104 of FIG. 1) implementing the antenna mapping for uplink performance improvement. The example method 400 may also be performed by system 200 of FIG. 2, controlled or implemented by processor 210, and/or computer system 700 of FIG. 7. But method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the UE 102 selects two antennas from a plurality of antennas of the UE 102, which is a first step of the two-step antenna selection. For example, the UE 102 selects the antennas 260a and 260b of the system 200. In some aspects, the UE 102 selects the antennas 260a and 260b based on signal metrics, such as reference signal receive power (RSRP) levels and/or signal-to-noise ratios (SNRs). For example, the UE 102 receives signals, such as CSI-RSs or SSB signals from the base station 104 using antennas 260a, 260b, 260c, and 206d via a DL connection of the communication link 106. The UE 102 calculates the RSRP levels and/or SNRs of the CSI-RSs or the SSB signals received using each antenna and determines that the CSI-RSs or the SSB signals received using the antennas 260a and 260b have highest RSRP levels or SNRs. In some aspects, the UE 102 selects the antennas 260a and 260b by determining that the RSRP levels corresponding to the antennas 260a and 260b are higher than a power threshold or the SNRs corresponding to the antennas 260a and 260b are higher than an SNR threshold.

In some aspects, the UE 102 selects the antennas 260a and 260b based on signal metrics and correlation levels. For example, the UE 102 determines that the CSI-RS or the SSB signals received using the antenna 206a has the highest RSRP level or SNR. The UE 102 selects the antenna 260a. Subsequently, the UE 102 determines correlation values between the antennas 260a and each of the antennas 260b, 260c, and 206d. The UE 102 may determine that the correlation value between the antennas 260a and 260b is lowest or below a correlation threshold and select the antenna 260b. In some aspects, the correlation values depend on locations and/or directions of the antennas 260a, 260b, 260c, and 206d.

In some aspects, the UE 102 selects the antennas 260a and 260b based on correlation values without consideration of signal metrics. For example, the UE 102 determines correlation values of each pair of two antennas among the antennas 260a, 260b, 260c and 206d. In such a case, there are six pairs of antennas. The UE 102 may determine that the correlation value of the antennas 260a and 260b is the highest and select the antennas 260a and 260b.

At 404, the base station 104 transmits an SRS resource configuration to the UE 102. In some aspects. The SRS resource configuration indicates at least two SRS resources, i.e., a first and a second SRS resource. For example, the SRS resource configuration indicates time and frequency resources for the UE 102 to transmit SRSs to the base station 104. In some aspects, the base station 104 transmits the SRS resource configuration periodically with an SRS period.

In some aspects, the SRS resource configuration also includes an antenna mapping indicator. For example, the antenna mapping indicator instructs the UE 102 to perform the code-book based antenna selection. In some aspects, the base station 104 transmits the antenna mapping indicator via downlink control information (DCI), wherein the one or more bits corresponding to the antenna mapping indicator are different from those of the SRS resource configuration. For example, the base station 104 includes the antenna mapping indicator in a txConfig parameter of the DCI.

At 406, the UE 102 transmits a first SRS via the first SRS resource via the antenna 260a and transmits a second SRS via the second SRS resource via the antenna 260b to the base station 104.

At 408, upon receiving the first and the second SRSs, the base station 104 generates a code-book based on the first and the second SRSs received. For example, the base station 104 knows the first and the second SRSs transmitted by the UE 102. Based on this, the base station 104 determines phase distortions between the transmitted first and second SRSs and the received first and second SRSs and determines a code-book that compensates for the phase distortions, which can then be used to pre-compensate for same or similar phase distortions that occur in uplink transmissions. In such a case, when the UE 102 pre-codes signals of the antennas 260a and 260b in uplink transmissions to pre-compensate for phase distortions, the signals are accumulatively combined when received by the base station 104. In some aspects, the base station 104 calculates RSRP levels and/or SNRs of the first and the second SRSs received. The base station 104 may determine that the RSRP level or the SNR of the first SRS is higher than a threshold. The base station 104 generates the code-book that nulls the antenna 260b. For example, the base station 104 sets a parameter in the code-book corresponding to antenna 260b to be 0. In some aspects, the base station 104 determines that the RSRP level or the SNR of the first SRS is higher and that a difference between the RSRP levels or the SNRs of the first and the second SRSs received is higher than a threshold. In such a case, the base station 104 similarly generates the code-book that nulls the antenna 260b. In other words, the base station generates the code-book to null one of antennas 260a,b that is not preferred.

At 410, the base station 104 generates a PMI based on the code-book. For example, the base station 104 looks up a table and determines the PMI corresponding to the code-book in the table. In some aspects, the table is predefined and stored in the base station 104, such as in memory 250 of the system 200.

At 412, the base station 104 transmits the PMI to the UE 102. In some aspects, the base station 104 transmits the PMI using DCI via a DL connection of the communication link 106.

At 414, the UE 102 performs precoding to signals to be transmitted by the antennas 260a and 260b, based on the received PMI. For example, the UE 102 looks up the table and determines the code-book corresponding to the received PMI. In some aspects, the table is predefined and stored in the UE 102, such as in memory 250 of the system 200. The UE 102 then applies the code-book to the signals to be transmitted by the antennas 260a and 260b. In some aspects, the UE 102 rotates phases of the signals to be transmitted according to the code-book. In other aspects, the code-book nulls the antenna 260b as discussed above. In such a case, the UE 102 selects the antenna 260a. In other words, the UE selects one of antennas 260a,b based on the code-book parameters and any respective null. Step 414 alone or in combination with the steps 404, 406, 408, 410, and 412 is a second step of the two-step antenna selection.

At 416, the UE 102 performs uplink transmissions after the precoding. In some aspects, the UE 102 transmits using the antenna 260a based on the code-book. The uplink transmissions include at least physical uplink control channel (PUCCH) transmissions and/or physical random access channel (PRACH) transmissions.

Figure 5:
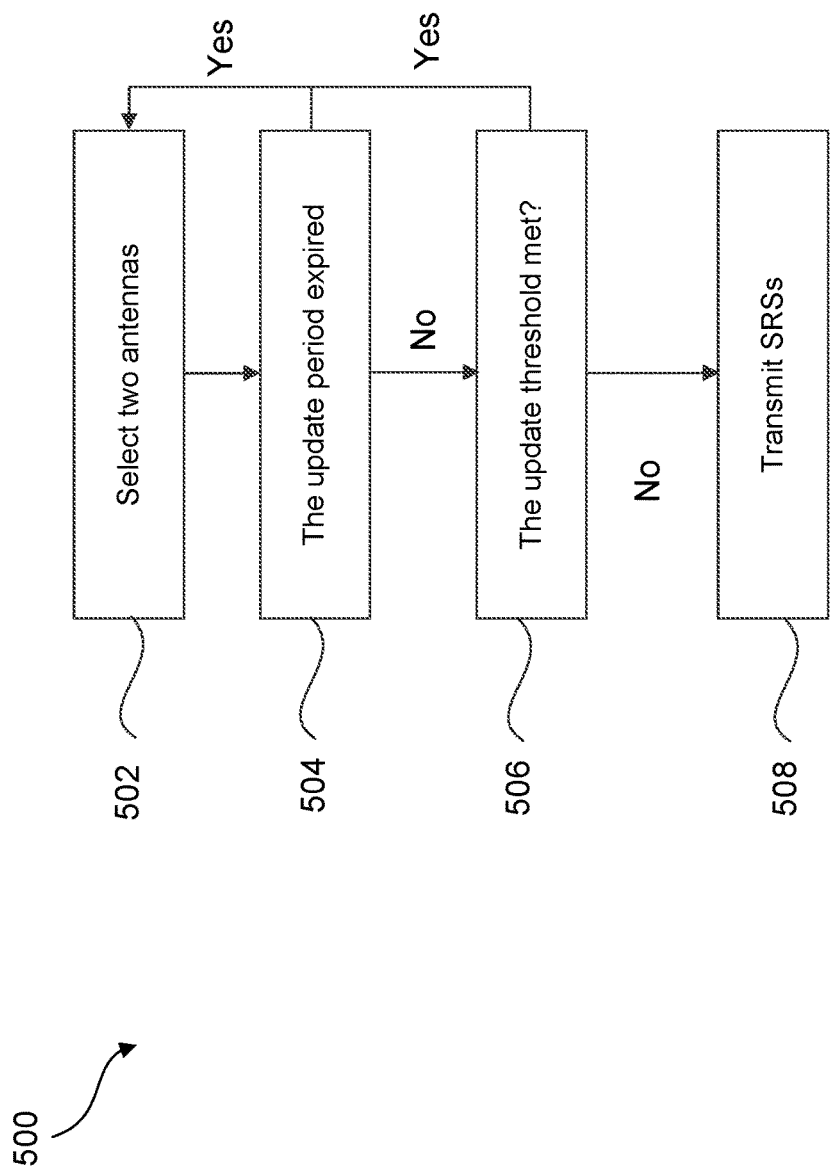
FIG. 5 illustrates an example method for an antenna selection based on mapping criteria, according to aspects of the disclosure.

FIG. 5 illustrates an example method for an antenna selection based on mapping criteria. As a convenience and not a limitation, FIG. 5 may be described with regard to elements of FIGS. 1, 2, and 7. Method 500 may represent the operation of electronic devices (for example, the UE 102 and the base station 104 of FIG. 1) implementing the antenna mapping for uplink performance improvement. The example method 500 may also be performed by system 200 of FIG. 2, controlled or implemented by processor 210, and/or computer system 700 of FIG. 7. But method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5. In some aspects, the method 500 describes details of 302 and 402 of FIGS. 3 and 4.

At 502, the UE 102 selects two antennas from the plurality of antennas of the UE 102. For example, the UE 102 selects the antennas 260a and 260b as discussed above in 302 or 402 of FIG. 3 or 4.

At 504, the UE 102 determines whether an update period is expired. The update period is a multiple of the SRS period in 304 or 404 of FIG. 3 or 4. For example, the SRS period may be 20 ms and the update period can 40 ms, 60 ms, etc. The UE 102 may determine that the update period is expired. The control moves back to 502 and the UE 102 selects two antennas again. If the UE 102 determines that the update period is not expired, the control moves to 506.

At 506, the UE 102 determines whether an update threshold is met. For example, the update threshold can be RSRP levels or SNRs of the selected antennas, such as the antennas 260a and 260b. The UE 102 may determine that the RSRP levels or the SNRs of the antennas 260a or 260b are below a threshold and therefore the update threshold is met. In some aspects, if the UE 102 selects the antennas 260a and 260b based on signal metrics and correlation levels in 502, the UE 102 may determine that the correlation value between the antenna 260a and the antenna 260b is higher than a threshold or higher than a correlation value between the antenna 260a and the antenna 260c. In such a case, the UE 102 determines that the update threshold is met. In some aspects, the UE 102 may determine that the correlation value between the antenna 260a and the antenna 260b is not the highest among all possible pairs of the antennas 260a, 260b, 260c, and 260d. In such a case, the UE 102 determines that the update threshold is met. When the update threshold is met, the control moves back to 502 and the UE 102 selects two antennas again. If the UE 102 determines that the update threshold is not met, the control moves to 508.

At 508, the UE 102 transmits SRSs using the antennas selected in 502 as discussed in 306 or 406 of FIG. 3 or 4.

Figure 6:
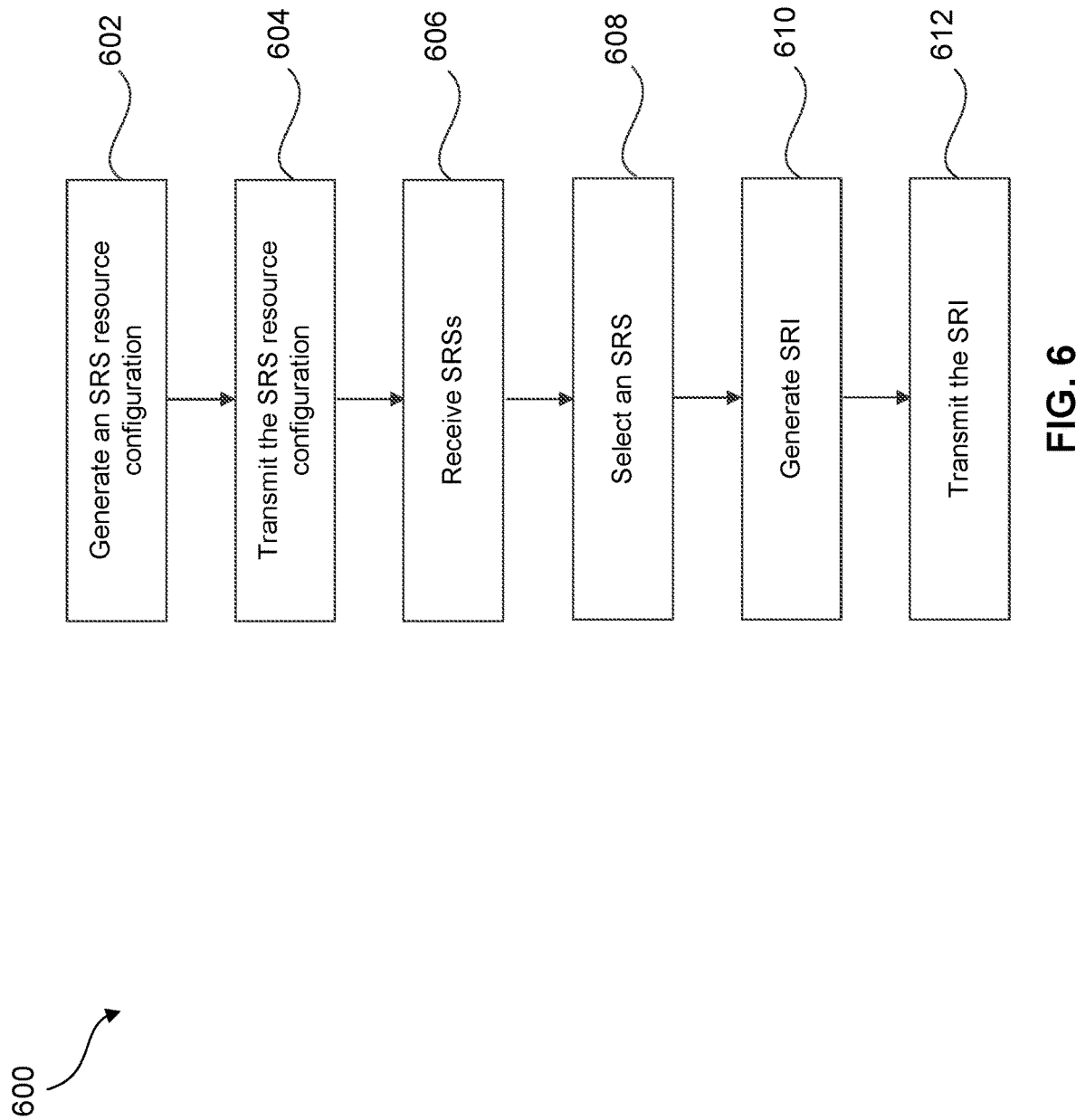
FIG. 6 illustrates an example method for a base station selecting an antenna based on received SRSs, according to aspects of the disclosure.

FIG. 6 illustrates an example method for selecting an antenna based on received SRSs. As a convenience and not a limitation, FIG. 6 may be described with regard to elements of FIGS. 1, 2, and 7. Method 600 may represent the operation of electronic devices (for example, the UE 102 and the base station 104 of FIG. 1) implementing the antenna mapping for uplink performance improvement. The example method 600 may also be performed by system 200 of FIG. 2, controlled or implemented by processor 210, and/or computer system 700 of FIG. 7. But method 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

At 602, the base station 104 generates an SRS resource configuration indicating at least two SRS resources, i.e., a first and a second SRS resources. The SRS resource configuration may also indicate four SRS resources. In some aspects, the base station 104 transmits the SRS resource configuration periodically with an SRS period. The SRS resource configuration can also include an antenna mapping indicator. For example, the antenna mapping indicator instructs the UE 102 to perform the SRI based antenna selection or the code-book based antenna selection.

At 604, the base station 104 transmits the SRS resource configuration to the UE 102. In some aspects, the base station 104 transmits the SRS resource configuration via DCI. The base station 104 can also transmit the antenna mapping indicator via the DCI, wherein one or more bits corresponding to the antenna mapping indicator are different from those of the SRS resource configuration.

At 606, the base station 104 receives a first SRS via the first SRS resource and a second SRS via the second SRS resource from the UE 102. The first and the second SRSs transmitted by the UE 102 may be identical or different. Nevertheless, the first and the second SRSs receive by the base station 104 are different due to different channel distortions, associated with the different first and second SRS resources. The base station 104 can also identify that the first SRS corresponds to the first SRS resource and that the second SRS corresponds to the second SRS resource.

At 608, the base station 104 selects an SRS based on a comparison between the first and the second SRSs. For example, the base station 104 selects the first SRS based on a comparison of RSRP levels, SNRs, or BERs corresponding to the first and the second SRSs.

At 610, the base station 104 generates SRI based on the selected SRS. For example, the base station 104 selects the first SRS resource based on the selection of the first SRS because the first SRS resource corresponds to the first SRS. The base station 104 then identifies the SRI corresponding to the first SRS resource.

At 612, the base station 104 transmits the SRI to the UE 102. In some aspects, the base station 104 transmits the SRI using DCI via a DL connection of the communication link 106.

Figure 7:
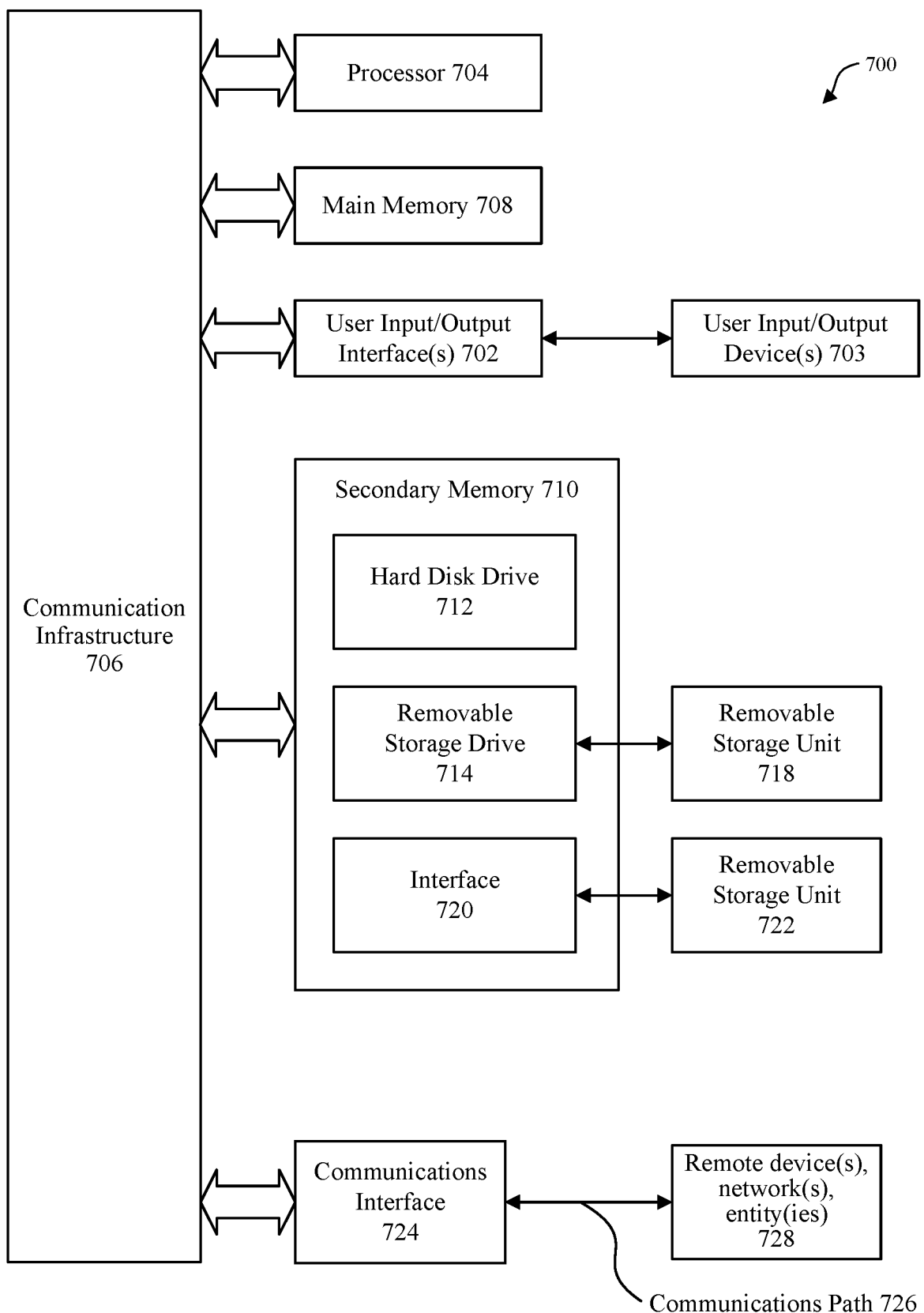
FIG. 7 is an example computer system for implementing some aspects of the disclosure or portion(s) thereof.

Various aspects may be implemented, for example, using one or more computer systems, such as computer system 700 shown in FIG. 7. Computer system 700 may be any computer capable of performing the functions described herein once programmed, including the functions described ins FIGS. 3-6, by electronic devices 102 and 104 of FIG. 1, or 200 of FIG. 2. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
 a transceiver configured to enable wireless communication with a base station; and
 a processor, communicatively coupled to the transceiver, and configured to:
  receive, using the transceiver, a sounding reference signal (SRS) resource configuration from the base station, wherein the SRS resource configuration indicates at least a first SRS resource and a second SRS resource;
  select a first antenna and a second antenna from a plurality of antennas periodically:
  transmit, using the first antenna coupled to the transceiver, a first SRS via the first SRS resource to the base station;
  transmit, using the second antenna coupled to the transceiver, a second SRS via the second SRS resource to the base station;
  receive, using the transceiver, an SRS resource indicator (SRI) from the base station based on at least one of the transmission of the first SRS or the second SRS;
  select the first antenna based on the SRI indicating the first SRS resource; and
  transmit uplink data to the base station using the first antenna,
  wherein a period of the selecting the first antenna and the second antenna is a multiple of an SRS period.

2. The UE of claim 1,
 wherein the transceiver is coupled to the plurality of antennas, and
 wherein the processor is further configured to transmit the first SRS and the second SRS by selecting the first antenna and the second antenna from the plurality of antennas.

3. The UE of claim 2, wherein the processor is further configured to select the first antenna and the second antenna from the plurality of antennas based on reference signal receive power (RSRP) levels or signal-to-noise ratios (SNRs) corresponding to the plurality of antennas.

4. The UE of claim 2, wherein the processor is further configured to select the first antenna and the second antenna from the plurality of antennas based on a correlation value of the first antenna and the second antenna.

5. The UE of claim 2, wherein the processor is further configured to:
determine that reference signal receive power (RSRP) levels or signal-to-noise ratios (SNRs) corresponding to a third antenna and a fourth antenna of the plurality of antennas are higher than RSRP levels or SNRs corresponding to the first antenna and the second antenna;
transmit, using the third antenna, the first SRS via the first SRS resource to the base station; and
transmit, using the fourth antenna, the second SRS via the second SRS resource to the base station.

6. The UE of claim 2, wherein the processor is further configured to receive the SRI via a downlink control information (DCI) transmission from the base station.

7. A method of operating a user equipment (UE) comprising:
receiving a sounding reference signal (SRS) resource configuration from a base station, wherein the SRS resource configuration indicates at least a first SRS resource and a second SRS resource;
select a first antenna and a second antenna from a plurality of antennas periodically;
transmitting, using the first antenna of the UE, a first SRS via the first SRS resource to the base station;
transmitting, using the second antenna of the UE, a second SRS via the second SRS resource to the base station;
receiving an SRS resource indicator (SRI) from the base station;
selecting the first antenna based on the SRI indicating the first SRS resource; and
transmit uplink data to the base station using the first antenna of the UE,
wherein a period of the selecting the first antenna and the second antenna is a multiple of an SRS period.

8. The method of claim 7,
wherein the UE comprises the plurality of antennas,
wherein the transmitting the first SRS and the second SRS further comprises selecting the first and the second antennas from the plurality of antennas.

9. The method of claim 8, further comprising selecting the first antenna and the second antenna from the plurality of antennas based on reference signal receive power (RSRP) levels or signal-to-noise ratios (SNRs) corresponding to the plurality of antennas.

10. The method of claim 8, further comprising selecting the first antenna and the second antenna from the plurality of antennas based on a correlation value of the first antenna and the second antenna.

11. The method of claim 8, further comprising:
determining that reference signal receive power (RSRP) levels or signal-to-noise ratios (SNRs) corresponding to a third antenna and a fourth antenna of the plurality of antennas are higher than the RSRP levels or the SNRs corresponding to the first antenna and the second antenna;
transmitting, using the third antenna of the UE, the first SRS via the first SRS resource to the base station; and
transmitting, using the fourth antenna of the UE, the second SRS via the second SRS resource to the base station.

12. The method of claim 8, further comprising receiving the SRI via a downlink control information (DCI) transmission from the base station.

13. A base station comprising:
a transceiver configured to enable wireless communication with a user equipment (UE); and
a processor, communicatively coupled to the transceiver, and configured to:
generate a sounding reference signal (SRS) resource configuration indicating at least a first SRS resource and a second SRS resource;
transmit, using the transceiver, the SRS resource configuration to the UE;
receive, using the transceiver, a first SRS via the first SRS resource from a first antenna of the UE and a second SRS via the second SRS resource from a second antenna of the UE, wherein the first antenna and the second antenna are selected from a plurality of antennas periodically and a period of the selecting the first antenna and the second antenna is a multiple of an SRS period;
compare the first SRS with the second SRS;
select the first SRS based on the comparison;
select the first SRS resource based on the selection of the first SRS;
generate an SRS resource indicator (SRI) based on the selection of the first SRS resource; and
transmit, using the transceiver, the SRI to the UE.

14. The base station of claim 13, wherein the processor is further configured to transmit the SRI to the UE via a downlink control information (DCI) transmission.

15. The base station of claim 13, wherein the processor is further configured to select the first SRS by:
determining reference signal receive power (RSRP) levels or signal-to-noise ratios (SNRs) of the first SRS and the second SRS; and
determining that an RSRP level of the first SRS is higher than an RSRP level of the second SRS or an SNR of the first SRS is higher than an SNR of the second SRS.

16. The base station of claim 13, wherein the processor is further configured to transmit the SRS resource configuration to the UE periodically with an SRS period.

17. The base station of claim 13, wherein the first antenna and the second antenna are selected from the plurality of antennas based on reference signal receive power (RSRP) levels or signal-to-noise ratios (SNRs) corresponding to the plurality of antennas.

18. The base station of claim 13, wherein the first antenna and the second antenna are selected from the plurality of antennas based on a correlation value of the first antenna and the second antenna.

* * * * *